United States Patent Office 2,774,109
Patented Dec. 18, 1956

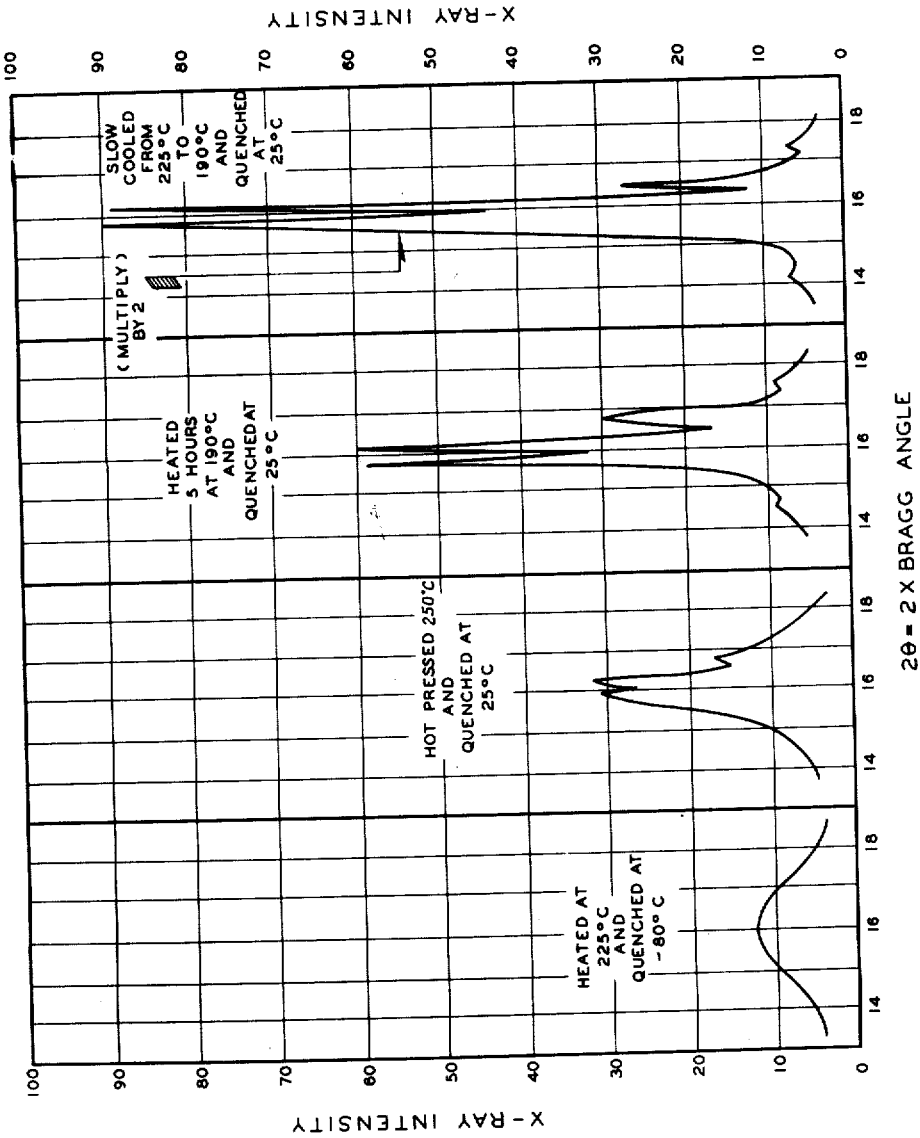

2,774,109

HEAT TREATING PROCESS FOR TRIFLUORO-CHLOROETHYLENE POLYMERS

Herman S. Kaufman, New York, N. Y., assignor to The M. W. Kellogg Company, Jersey City, N. J., a corporation of Delaware Application May 6, 1953, Serial No. 353,393

18 Claims. (Cl. 18—48)

This invention relates to the treatment of perfluorochlorocarbon plastics. In one aspect the invention relates to the treatment of polytrifluorochloroethylene plastics. In another aspect the invention relates to a method of heat treating polytrifluorochloroethylene plastics so as to produce a substantially amorphous, normally solid, thermoplastic polymer.

The preparation of monomeric trifluorochloroethylene may be accomplished by various methods. One method comprises dechlorinating trifluorotrichloroethane, commercially available as Freon 113, under suitable conditions of dechlorination in the presence of a suitable solvent, such as methyl alcohol, with a dehalogenating agent, such as zinc dust, to produce an effluent comprising the monomer, unreacted trifluorotrichloroethane and solvent. Another method comprises dechlorinating trifluorotrichloroethane by passing said material over a catalyst selected from the group 1B and group VIII metals, and combinations thereof, in the presence of hydrogen, at a temperature above about 200° C. The effluent obtained from either of the above outlined processes is then passed to a suitable fractional distillation system in which substantially pure trifluorochloroethylene is recovered. It is usually preferred to conduct distillations in the presence of a terpene compound at a temperature above about 25° C. since this treatment removes impurities which are detrimental to the production of high molecular weight polymers. The terpene treatment step may be conducted with the first distillation step or at any convenient time prior to the introduction of the monomer into the polymerization zone.

The monomer, obtained as described above, is polymerized under suitable polymerization conditions with or without the presence of a suitable catalyst or promoter. Such conditions may comprise the use of a suitable catalyst, such as bis-trichloroacetyl peroxide, dissolved in a suitable solvent such as trichlorofluoromethane at a temperature between about −20° C. and about 50° C. An additional polymerization process employing substantially the same conditions as described above may be used. In this process a different type of polymerization reactor is employed and the polymer is formed as a suspension in the monomer and is recovered therefrom by filtration.

The polymer produced by either of the above described processes is characterized by wholly different chemical and physical characteristics than otherwise similar but non-fluorinated polymeric materials. The chemical resistance of polytrifluorochloroethylene is such that it will withstand exposure to a wide variety of oxidizing, reducing and solvent-type materials such as fuming nitric acid, concentrated sulfuric acid, hydrazine, hydrogen peroxide, acetone, aniline, etc. Physically, the material possesses high heat stability, tensile strength, etc. In addition to the above, these polymers are readily molded into various useful articles such as valves, gaskets, etc. using conventional equipment and operating conditions with only slight modification.

The term polymer, as used herein, includes both homopolymers and copolymers.

It is an object of this invention to provide a method for producing substantially amorphous, normally solid, thermoplastic polymers of trifluorochloroethylene.

It is another object to provide a method for treating normally solid, thermoplastic polymers of polytrifluorochloroethylene so as to produce a substantially amorphous product possessing high tensile strength and heat stability and further characterized by its exceptional transparency, electrical properties etc.

Various other objects and advantages will become apparent to those skilled in the art on reading the accompanying description and disclosure.

Generally, the above objects are accomplished by heating the polymer above its transition temperature and by subsequently immersing the heated polymer, while still above its transition temperature, in a cooling media maintained at a temperature below about 0° C.

The amorphous polymer, which is obtained by this treatment, has different and more satisfactory physical characteristics than polymer not so treated. Amorphous polymer has more satisfactory heat-aging behavior, because there are no seed crystallites present to nucleate crystallite growth. The presence of these crystallites also tends to cause a non-uniform growth even at relatively low temperatures while the amorphous form resists growth, until finally when it does crystallize, it does so uniformly. In addition, amorphous polymer has more desirable electrical properties and higher tensile strength.

The polymers which are particularly suited to the process of this invention are high molecular weight, normally solid, thermoplastic polymers as contrasted with low molecular weight polymers in the oil, grease, or wax range, which are obviously not suited to the process of this invention. Since the determination of molecular weight of the perfluorochloroolefin polymers, such as polytrifluorochloroethylene, is tedious and expensive, it has become an accepted practice to express the molecular weight of the polymer in terms of its no strength temperature (N. S. T.) which is dependent on the molecular weight. Thus, homo-polymers of trifluorochloroethylene which are suited to the process of this invention have a no strength temperature (N. S. T.) of above about 220° C.

This invention also contemplates the treatment of copolymers of trifluorochloroethylene containing below about 15 mol percent and preferably below about 5 mol percent of fluorine containing olefins, such as perfluorobutadiene, vinylidene fluoride, difluorodichloroethylene, difluoroethylene, trifluoroethylene, perfluorostyrene, perfluorocyclobutene, and phenyltrifluoroethylene. The polymers and copolymers which are to be treated, may contain up to about 25% of a fluorinated plasticizer. The fluorinated plasticizers are the lower members of the saturated perfluorochlorocarbon series, for example, polytrifluorochloroethylene in the oil to wax range. The addition of plasticizer to the polymer, in some instances, advantageously modifies the characteristics of the polymer, for example, by increasing its pliability, etc. The presence of a copolymer or of a plasticizer or both will obviously effect the transition temperature and the N. S. T. of the material. Usually the transition temperature and the N. S. T. will be depressed or lowered depending upon the percentage of plasticizer and/or copolymer. Thus, the N. S. T. of a plasticized copolymer may be as low as 200° C. The process of this invention is therefore applicable to polymers having an N. S. T. of at least 200° C. and preferably above 220° C. The plasticized copolymer may have a transition temperature as low as 130° C. Since it is usually preferred to heat the polymer to a point above its transition temperature, it will usually be convenient to disregard the presence of plasticizer etc., and simply heat above the transition temperature of the pure homo-polymer of trifluorochloroethylene, that is above about 210° C. In any event, the transition temperature may be determined by standard techniques as discussed herein.

As the N. S. T., that is, the molecular weight of the polymer, increases, some of the beneficial effects of this invention decrease. This is believed due to the formation or presence of long chain structures within the molecule which tend to interlock thereby ovrcoming some of the adverse effects caused by the presence of crystallites. Thus, very little difference is observed between heat embrittlement tests on treated and untreated polymers whose N. S. T. values are above about 350° C. However, it will still be desirable to treat these high N. S. T. materials since such treatment results in greater clarity and improved electrical properties even though some of the other physical characteristics may not be appreciably affected.

The dimensional character or form of the polymer to be treated is immaterial. Thus, the polymer may be in the form of sheets, rods, threads, or it may be present as a coating on a metal or cloth, etc. The size of the polymer is also immaterial. Thus, large valves, pipes, or other simple or complex devices formed from polymers of trifluorochloroethylene may be treated by the process of this invention. In order to carry out the process of this invention, the transition temperature of the polymer, the temperature of the cooling media in which the polymer is to be immersed, the media itself, and the means of treating the polymer with the media must be considered. As was stated above, the polymer is to be heated above its transition temperature. The transition temperature may be accurately determined using the procedures given in the various texts and laboratory manuals on physical chemistry or in the trade journals. A particularly convenient method of determining transition temperature comprises immersing a crystalline sample of the polymer under test in a suitable media such as oil or air wherein it can be observed between crossed Polaroids while gradually raising the temperature of the media. As the polymer approaches its transition temperature, it will become progressively more isotropic and as the temperature is increased, a point will be reached at which it will lose its opacity as seen through the Polaroids and become transparent. The temperature at this point is the transition temperature of the polymer. The transition temperature is independent of the N. S. T. value of the polymer and also of the prior history of heat treatment of the polymer. Within the N. S. T. range contemplated by this invention, it has been experimentally established that the transition temperature of the homo-polymer of trifluorochloroethylene is approximately 210° C. Thus, it will usually be adequate to heat the polymer that is to be treated to a point somewhere above 210° C., preferably above 215° C. and below the decomposition temperature.

After the material has been heated above its transition temperature, and while still above the transition temperature it is immersed or quenched in a cooling media maintained below about 0° C. The exact temperature of this cooling media will depend on a number of factors but principally on the size or thickness of the material being treated. Since the purpose of operating below 0° C. is to quickly cool the material, it will be apparent that as the size or thickness of the material increases, the temperature must be decreased. Usually temperatures below about 0° C. and above about −270° C. may be employed. For relatively thin specimens a particularly suitable temperature is below about 0° C. and above about −80° C. For example, when treating sheets or films of polymer of approximately one-sixteenth inch thickness, it has been found satisfactory to operate at a temperature between −30° and about− 80° C. For thicker specimens a particularly suitable temperature is between about −50° C. and about −200° C. It is usually preferred to employ temperatures between about −30° C. and about −150° C.

The low temperature required for the successful operation of this invention may be obtained by employing any of the conventional freezing mixtures such as solid carbon dioxide, or Dry Ice, mixed with alcohol, acetone, chloroform, and those other mixtures which are set out in various texts on the subject such as calcium chloride and snow. In addition to the above described freezing mixtures, various liquefied gases may be used such as liquid helium, hydrogen, oxygen, and air. The freezing mixture or liquefied gas will be selected for use on the basis of the required temperature. Thus, for conducting operations where a temperature of about −270° C. is required, liquid helium may be employed, whereas mixtures of Dry Ice and suitable solvents, such as alcohol, may be employed where a temperature of about −80° C. is required. The cooling media may be contained in an insulated or non-insulated vessel depending upon the temperature employed. Where operations are conducted at extremely low temperatures, it is preferable to employ insulated equipment because of the savings thereby made possible. The container or vessel may also be adapted so as to maintain the coolant under pressure when liquid gases are employed.

Quenching of the heated polymer may be accomplished by any convenient method. Thus, if the polymer is contained in a mold, the mold may be immersed in the cooling media or the coolant may be circulated through the mold. If the polymer is in sheet form, it may be passed between rollers through which the cooling media is circulated. Rods, pipes, filaments, or other similar materials may be passed through a die which contains the coolant. Because of the expense involved in fabricating and maintaining equipment such as described above, it is usually preferred to immerse or quench the polymer in the cooling media contained in a tank or other appropriate vessel.

In order to more specifically define the invention, certain examples are given below. These examples are not to be construed as unnecessarily limiting the invention.

*Example I*

A sample of polytrifluorochloroethylene, having an N. S. T. of about 270° C., in the form of a one-sixteenth inch thick pressed sheet, was heated in an oil bath at about 220° C., that is above its transition temperature. After heating about five to ten minutes, the opalescence completely disappeared and the material became transparent. The polymer while at a temperature of about 220° C. was then rapidly immersed in a mixture of Dry Ice and alcohol (about −80° C.). This low temperature immersed sample was glass clear after removal from the Dry Ice bath and remained so when kept at room temperature. X-ray diffraction curves obtained with a Geiger counter diffractometer showed the material to have a substantially amorphous pattern. Another sample of the same material treated as described above but allowed to cool at room temperature was highly opaque and on X-ray examination was found to possess considerable crystalline growth.

*Example II*

A specimen was prepared from a dispersion of polyfluorotrichloroethylene in di-isobutyl ketone and xylene by flowing onto a glass plate and baking at elevated temperatures, i. e. about 250° C. This specimen was divided in half. One half, while still above about 210° C., was immersed in liquid nitrogen whereas the other was allowed to cool at room temperature. The tensile strength of the film in the amorphous state, that is the film which was immersed in liquid nitrogen, was extremely high and the film itself was transparent whereas the untreated film was quite weak, tore rather easily, and was opaque.

Figure 1 of the drawing presents X-ray diffractometer recordings of the 5.5 A. region of four specimens of trifluorochloroethylene polymer. Each of the specimens was subjected to a different heat treating process. The figure is largely self-explanatory. However, certain conclusions should be stressed. Thus, the polymer must be heated above its transition temperature; the polymer must be quenched before it cools below the transition temperature and the quenching temperature must be below 0° C. It should also be pointed out that the polymer treated by the process of this invention, i. e. substantially amorphous polymer, is characterized by a low intensity, broad diffraction line in the 5.5 A. region. As the degree of crystallinity increases, X-ray intensity increases proportionally and the broad line characteristic of the amorphous material splits into two strong and relatively sharp lines and other weaker lines.

Various modifications and alterations of the process of this invention will be apparent to those skilled in the art and may be used without departing from the scope of this invention.

Having thus described my invention, I claim:

1. A process for the production of an amorphous polymer of trifluorochloroethylene which comprises heating a thermoplastic polymer of trifluorochloroethylene above its transition temperature and subsequently immersing said heated polymer while at a temperature above its transition temperature in a cooling media maintained at a temperature not higher than −30° C.

2. The process of claim 1 wherein the cooling media is liquid nitrogen.

3. The process of claim 1 wherein the cooling media is liquid helium.

4. The process of claim 1 wherein the cooling media is liquid oxygen.

5. The process of claim 1 wherein the cooling media is solid carbon dioxide and acetone.

6. A process for the production of a substantially amorphous polymer of trifluorochloroethylene which comprises heating thermoplastic homo-polymers of trifluorochloroethylene having an N. S. T. above about 220° C. to a temperature above about 210° C. and immersing said heated polymer while at a temperature above its transition temperature in a cooling media maintained between about −30° C. and about −80° C.

7. A process for the production of a substantially amorphous polymer of trifluorochloroethylene which comprises heating thermoplastic homo-polymers of trifluorochloroethylene having an N. S. T. above about 220° C. to a temperature above about 210° C. and immersing said heated polymer while at a temperature above its transition temperature in a cooling media maintained between about −50° C. and about −200° C.

8. A process for the production of a substantially amorphous polymer of trifluorochloroethylene which comprises heating thermoplastic homo-polymers of trifluorochloroethylene having an N. S. T. above about 220° C. to a temperature above about 210° C. and immersing said heated polymer while at a temperature above its transition temperature in a cooling media maintained between about −30° C. and about −150° C.

9. A process for the production of an amorphous polymer of trifluorochloroethylene which comprises heating thermoplastic homo-polymers of trifluorochloroethylene having an N. S. T. of about 270° C. above its transition temperature by immersing said polymer in an oil bath maintained at about 220° C. and subsequently immersing the heated polymer while at a temperature above about 210° C. in a cooling mixture comprising Dry Ice and alcohol.

10. A process for the production of an amorphous polymer of trifluorochloroethylene which comprises flowing a dispersion of particulate trifluorochloroethylene polymer in a vehicle on to a glass plate and baking at elevated temperatures to fuse the particles and evaporate the vehicle removing the film thus formed from the plate heating the film to a temperature above about 220° C. and immersing the heated film while at a temperature above about 210° C. in a cooling media comprising liquid nitrogen.

11. A process for the production of an amorphous polymer of trifluorochloroethylene containing between about 1% and about 25% of polytrifluorochloroethylene in the oil, grease, and wax range as a plasticizer which comprises heating said plasticized polymer above its transition temperature and subsequently immersing said heated plasticized polymer while at a temperature above its transition temperature in a cooling media maintained at a temperature not higher than −30° C.

12. A process for the production of an amorphous copolymer of trifluorochloroethylene which comprises heating a thermoplastic copolymer of trifluorochloroethylene and another fluorine containing olefin, said fluorine containing olefin being present in an amount below about 15 mol percent, above its transition temperature and subsequently immersing said heated copolymer while at a temperature above its transition temperature in a cooling media maintained at a temperature not higher than −30° C.

13. The process of claim 12, wherein the fluorine containing olefin is vinylidene fluoride.

14. The process of claim 12, wherein the fluorine containing olefin is perfluorobutadiene.

15. The process of claim 12, wherein the fluorine containing olefin is difluorodichloroethylene.

16. The process of claim 12, wherein the fluorine containing olefin is perfluoropropene.

17. A process for the production of the amorphous polymer of trifluorochloroethylene in sheet form which comprises heating a sheet of a thermoplastic polymer of trifluorochloroethylene above about 210° C. and subsequently passing said heated sheet of polymer, while at a temperature above about 210° C. between stainless steel rollers maintained at a temperature not higher than −30° C.

18. A process for the production of a substantially amorphous polymer of trifluorochloroethylene which comprises heating a thermoplastic homopolymer of trifluorochloroethylene having an N. S. T. above about 220° C. to a temperature above about 210° C. and immersing said heated polymer while at a temperature above about 210° C. in a non-aqueous cooling media maintained at a temperature not higher than −30° C.

References Cited in the file of this patent

UNITED STATES PATENTS

| | | |
|---|---|---|
| 2,531,134 | Kropa | Nov. 21, 1950 |
| 2,573,639 | Coler | Oct. 30, 1951 |
| 2,617,152 | Rubin | Nov. 11, 1952 |
| 2,667,474 | Miller | Jan. 26, 1954 |

FOREIGN PATENTS

| | | |
|---|---|---|
| 578,168 | Great Britain | June 18, 1946 |

OTHER REFERENCES

Price: J. Am. Chem. Soc., 74, 311–18 (January 1952).

Maddock: Modern Plastics, 116, 118, 120, 209 (February 1953).

UNITED STATES PATENT OFFICE

CERTIFICATE OF CORRECTION

Patent No. 2,774,109                                              December 18, 1956

Herman S. Kaufman

It is hereby certified that error appears in the printed specification of the above numbered patent requiring correction and that the said Letters Patent should read as corrected below.

Column 5, lines 45, 53, 61 and 69, for "thermoplastic homo-polymers", each occurrence, read --a thermoplastic homo-polymer--.

Signed and sealed this 28th day of May 1957.

(SEAL)
Attest:

KARL H. AXLINE

Attesting Officer

ROBERT C. WATSON
Commissioner of Patents